(12) United States Patent
Thomas et al.

(10) Patent No.: US 11,653,792 B2
(45) Date of Patent: May 23, 2023

(54) BENCH MIXER WHIPPING PROCESS MONITOR

(71) Applicant: BREVILLE PTY LIMITED, Alexandria (AU)

(72) Inventors: Mark Thomas, Leichhardt (AU); Lochana Subasekara Widanagamage Don, Caringbah (AU)

(73) Assignee: BREVILLE PTY LIMITED, Alexandria (AU)

( * ) Notice: Subject to any disclaimer, the term of this patent is extended or adjusted under 35 U.S.C. 154(b) by 716 days.

(21) Appl. No.: 16/341,871

(22) PCT Filed: Oct. 13, 2017

(86) PCT No.: PCT/AU2017/000217
§ 371 (c)(1),
(2) Date: Apr. 12, 2019

(87) PCT Pub. No.: WO2018/068078
PCT Pub. Date: Apr. 19, 2018

(65) Prior Publication Data
US 2019/0239693 A1 Aug. 8, 2019

(30) Foreign Application Priority Data

Oct. 13, 2016 (AU) .............................. 2016904156

(51) Int. Cl.
*A47J 43/044* (2006.01)
*B01F 35/21* (2022.01)
*A47J 43/07* (2006.01)

(52) U.S. Cl.
CPC ......... *A47J 43/044* (2013.01); *A47J 43/0705* (2013.01); *B01F 35/2112* (2022.01); *A47J 2043/04481* (2013.01)

(58) Field of Classification Search
CPC ................... A47J 43/044; A47J 43/082; A47J 2043/04481; A47J 2043/04454;
(Continued)

(56) References Cited

U.S. PATENT DOCUMENTS 3,815,115 A * 6/1974 Inque .................. A61C 5/68
366/142
4,145,143 A * 3/1979 Fontaine ............. B01F 35/2112
366/40
(Continued)

FOREIGN PATENT DOCUMENTS

AU 2005202491 A1 7/2005
AU 2014233605 A1 4/2015
(Continued)

OTHER PUBLICATIONS

Wang Wei, Translated Specification of Patent Application CN 105498596 A (Year: 2016).*
(Continued)

*Primary Examiner* — Charles Cooley
(74) *Attorney, Agent, or Firm* — Patterson + Sheridan, LLP

(57) ABSTRACT

A bench or stand mixer includes a bowl that contains ingredients, a motor that drives an accessory, for example a beater, to process the ingredients, and a sensor. The sensor provides a signal indicative of a change in the ingredients, with the sensor cooperating with a controller, for example a processor, to control the speed of the motor, in response to the change in condition of the ingredients.

9 Claims, 5 Drawing Sheets

(58) Field of Classification Search
CPC .... A47J 2043/04463; A47J 2043/04472; A47J 2043/0449; A47J 43/07; A47J 43/0705; B01F 15/00155; B01F 15/0035; B01F 35/2112
USPC .............................. 366/142, 153.1, 206, 601
See application file for complete search history.

(56) References Cited

U.S. PATENT DOCUMENTS

| | | | |
|---|---|---|---|
| 6,730,888 | B1 | 5/2004 | Battu |
| 6,776,517 | B2 * | 8/2004 | Afnan ................. B01F 7/00908 366/142 |
| 11,213,170 | B2 * | 1/2022 | Widanagamage Don ................... A47J 43/07 |
| 2004/0120215 | A1 | 6/2004 | Huang et al. |
| 2004/0208082 | A1 | 10/2004 | Huang et al. |
| 2010/0090038 | A1 * | 4/2010 | Jensen ................ B02C 18/2225 241/33 |
| 2015/0264954 | A1 | 9/2015 | Yu et al. |
| 2016/0220069 | A1 * | 8/2016 | Gardner ................ A47J 43/044 |
| 2016/0241653 | A1 * | 8/2016 | Ciepiel .................. H04L 67/306 |
| 2016/0278401 | A1 * | 9/2016 | Noth ......................... A23G 9/20 |
| 2018/0059790 | A1 * | 3/2018 | Kolar ...................... A47J 43/27 |
| 2018/0072553 | A1 * | 3/2018 | Lyons ..................... A47J 31/40 |
| 2018/0368622 | A1 * | 12/2018 | Widanagamage Don ................... A47J 43/06 |
| 2019/0239693 | A1 * | 8/2019 | Thomas ............... B01F 35/2112 |
| 2021/0169275 | A1 * | 6/2021 | Plazarte .............. B01F 27/2322 |

FOREIGN PATENT DOCUMENTS

| | | | |
|---|---|---|---|
| CN | 1120148 | A | 4/1996 |
| CN | 1360478 | A | 7/2002 |
| CN | 101722088 | A | 6/2010 |
| CN | 101990456 | A | 3/2011 |
| CN | 105498596 | A * | 4/2016 |
| CN | 105705027 | A | 6/2016 |
| CN | 105973998 | A | 9/2016 |
| EP | 0 589 093 | A1 | 3/1994 |
| RU | 2576608 | C2 | 3/2016 |
| WO | WO-2015/063094 | A1 | 5/2015 |
| WO | WO-2018068078 | A1 * | 4/2018 ............ A47J 43/044 |

OTHER PUBLICATIONS

International Search Report and Written Opinion for PCT/AU2017/000271, dated Nov. 3, 2017.
Extended European Search Report issued in European Patent Applicationi No. 17859725.8, dated Feb. 26, 2020.

* cited by examiner

BENCH MIXER WHIPPING PROCESS MONITOR

FIELD

The invention relates to bench mixers and more particularly to a bench mixer having process monitoring capabilities.

BACKGROUND

A bench mixer utilises a motorised head to propel a conventional or planetary type accessory. The accessory operates on foods contained in a mixing bowl located beneath the head.

It is a disadvantage of known bench mixers that the operate needs to continually monitor the ingredients in the mixer bowl to determine when the mixing process needs to be modified and/or terminated.

OBJECT

It is the object of the present to overcome or substantially ameliorate the above disadvantage.

SUMMARY

There is disclosed herein a processor to process a substance located in a container having an interior, the processor including:

a movement causing device to be located in the container interior so that relative movement between the container and the device causes processing of the substance;

an electric motor operatively to be associated with the container and device to cause said relative movement;

a sensor to produce a sensor beam to be directed at the interior so as to produce a reflection from the substance in the interior and to produce a signal indicative of the reflection; and a controller operatively associated with the sensor and motor, so as to receive the signal from the sensor so as to detect a change in the signal and therefore a change in the substance in the bowl, and to change operation of the motor when a predetermined change in the signal is detected by the controller.

Preferably, the sensor is an infrared sensor that produces the sensor beam, with the sensor beam being an infrared beam.

Preferably, the reflection has an intensity, and the controller is configured to change operation of the motor as a function of the reflection intensity.

Preferably, the controller is configured to record a base line reading in respect of the reflection intensity prior to operation of the processor, with the sensor and controller also being configured to determine a moving average of distance between the sensor and an upper surface of the substance in the container from which the beam is reflected.

Preferably, the controller is configured to change operation of the motor as a function of distance between the sensor and the upper surface.

Preferably, the container is a bowl, and the processor includes a body containing the motor and supporting the device so that the device extends downwardly from the body to the interior, and the sensor directs said beam downwardly toward the interior.

Preferably, the sensor and controller are configured to control the motor as a function of distance between the sensor and an upper surface of the substance.

Preferably, the function includes a moving average of said distance.

Preferably, the processor is a food processor.

There is further disclosed herein, in combination, the above processor and said container.

BRIEF DESCRIPTION OF THE DRAWING FIGURES

In order that the invention be better understood, reference is now made to the following drawing figures in which.

BEST MODE AND OTHER EMBODIMENTS OF THE TECHNOLOGY

Figure 1:
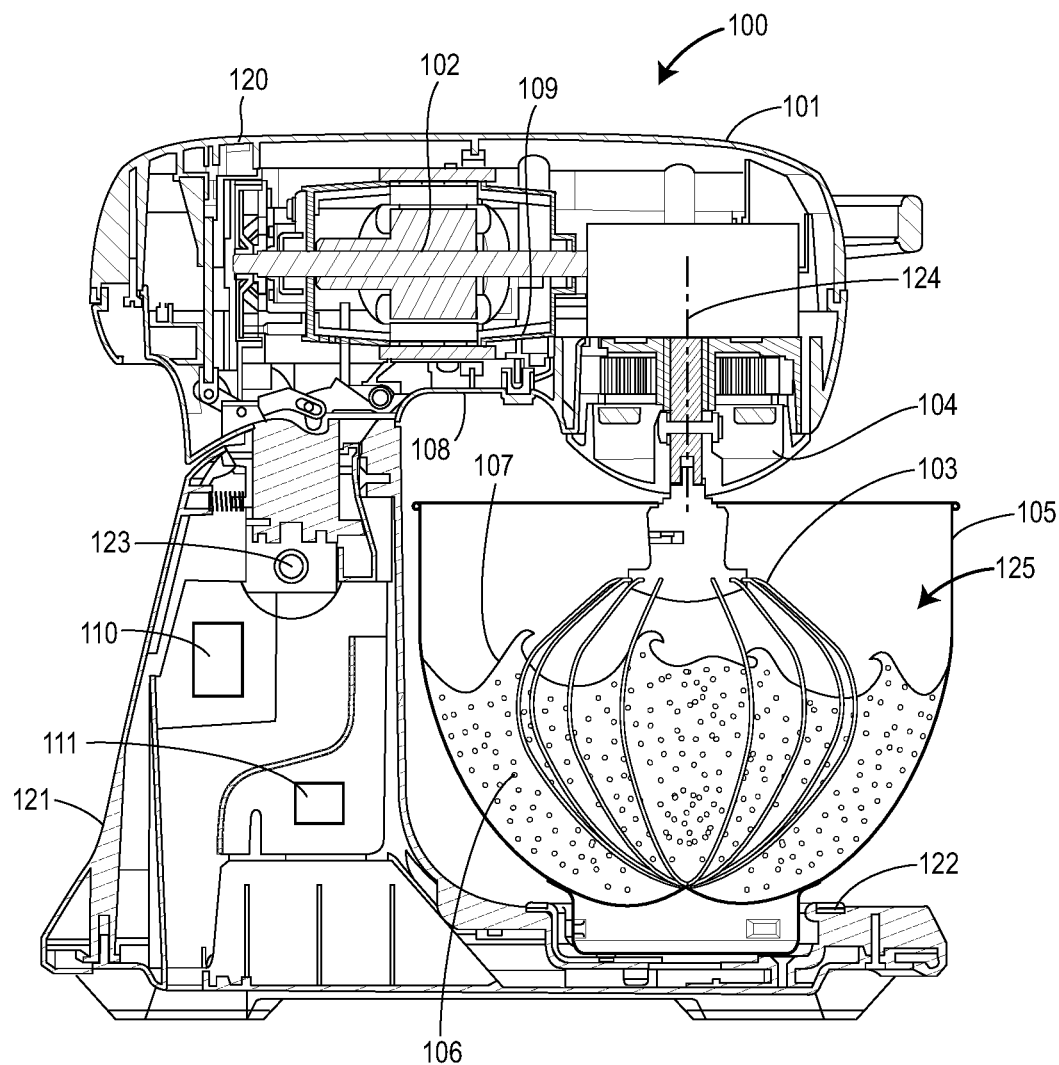
FIG. 1 is a cross-sectional view of a mixer having an infrared sensor.

A bench or stand mixer 100 is shown in FIG. 1. The mixer 100 has a pivoting head 101 within which may be located an electric motor 102. The motor 102 drives any one or a number of accessories 103. The head 101 may include a conventional or a planetary gear arrangement 104. Ultimately, the motor 102 drives the accessory 103 within a mixing bowl 105. The motor 102 is located above the bowl 105. The accessory 103 is a device to cause movement of the ingredients 106. The head 101 is part of the body 120 of the mixer 100. The body 120 includes a base 121 having a platform 122 upon which the bowl 105 rests. The head 101 is pivotally attached to the base 121 for angular movement about a generally horizontal axis provided by the pivot 123. The accessory 103 is driven for angular movement about a generally vertical axis 124. When ingredients 106 in the bowl 105 are agitated by the accessory 103 (for example egg whites) the upper surface 107 of the mixture may be irregular. Accordingly, acquiring a meaningful real time volumetric measurement of the contents of the bowl 105 while the mixer 100 is working, even visually, is complicated. Practically any transducer based measurement of the volume of ingredients 106 in the bowl 105 is also complicated by the movement of the bowl 100 and the accessory 103 within the bowl 105.

The whipping of egg whites into a foam is intended to continue until a maximum stable volume is reached. Further beating may be detrimental. The technology proposes an automated process for stopping the beating activity of the mixer 100 once a stable volume is reached. Accordingly, an underside of the head 101 is provided with a down-facing infrared sensor 109. The sensor 109 directs a sensor beam at the interior 125 of the bowl 105. The sensor 109 emits infrared radiation beam into the interior of the bowl 105 and detects a reflected infrared radiation. The sensor 109 provides electrical signal data to the mixer's processor 110 in proportion to the reflected radiation. The processor performs calculations on the infrared signal data to produce a value representative of the change in volume of the bowl's 105 contents (ingredients 106).

When this increasing change in volume has stabilised, the beating process is considered complete and the motor 102 may be turned off. In short, the mixer (100) determines a moving average of the vertical height of the upper surface 107 of the ingredients 106 and the processor 110 stops the whipping or beating process when the moving average achieves a stability that is indicative of a useful process endpoint.

The infrared sensor 109 measures the intensity of the infrared light reflected from the contents of the bowl 105. An increase in the amount or intensity of the reflected infrared light is used to infer a distance of an upper surface 107 of the bowl's 105 contents from the sensor 109.

Figure 2:
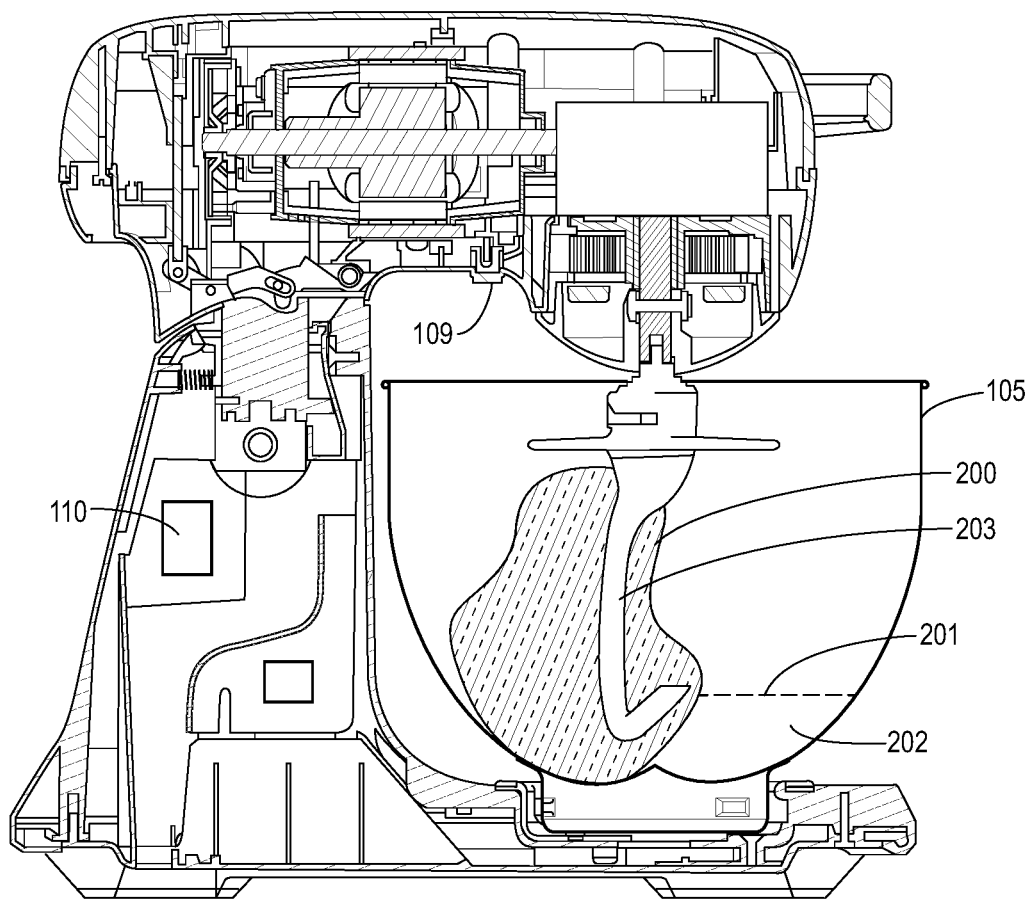
FIG. 2 is a cross-sectional view of a mixer having an infrared sensor when the mixer is making a dough ball.

As shown in FIG. 2 the sensor 109 may similarly be used in a process to determine when a dough ball 200 has formed in the mixing bowl 105. The sensor 109 can take a baseline reading determined by the upper surface 201 of raw ingredients 202 in the bowl 105 prior to mixing. The operation of a dough hook 203 combines the raw ingredients 202 into a ball. As the ball forms, it rises up the length of the dough hook 203. The hook 203 is a device to cause movement of the dough. The processor 110 uses the infrared signal to determine a moving average for the approximate height of the dough ball 200. When a target height has been reached, the motor 102 can be either stopped or allowed to run for an additional preset time determined by the user or by the processor 110.

Figure 3:
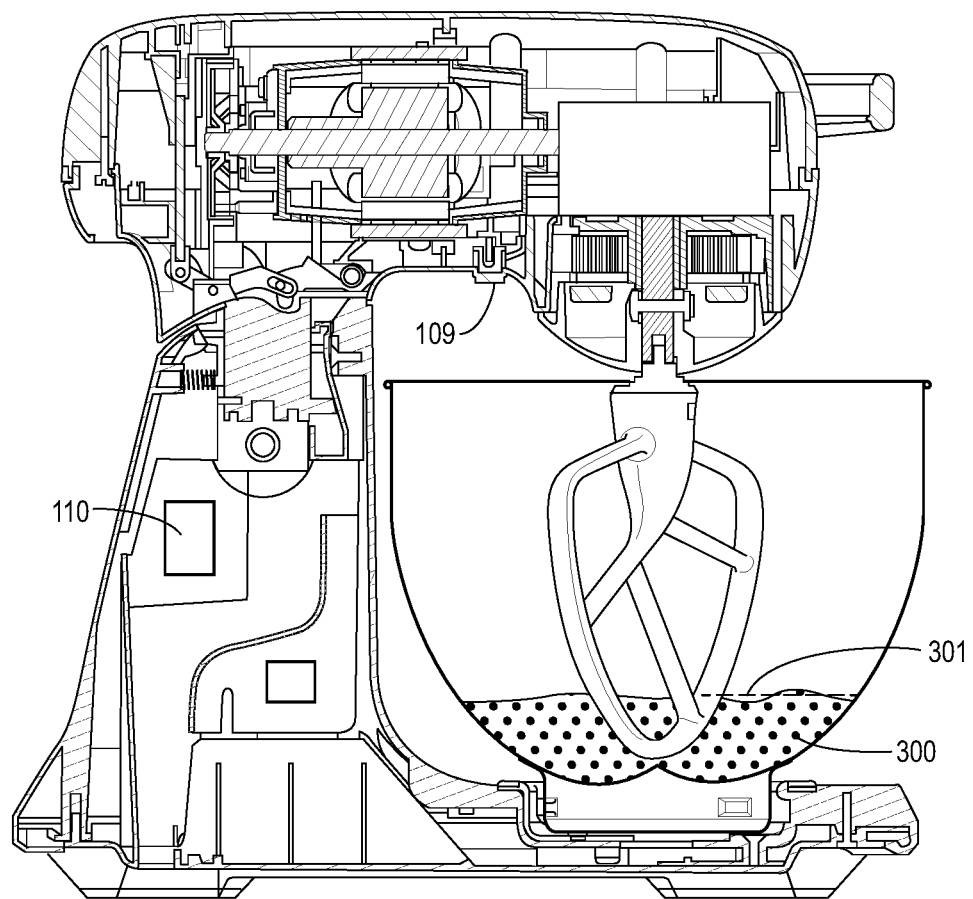
FIG. 3 illustrates the use of the technology in a butter and sugar mixture.

FIG. 3 illustrates a bowl 105 in which a mixing process occurs. Even when the volume of the ingredients 300 does not change, process information can be obtained from the infrared sensor 109. The change in reflectivity of the upper surface 301 can be detected by the sensor 109. The change in reflectivity of the surface 301 can be used to infer an extent of mixing that can be transmitted to the processor 110 and used to change parameters of the mixer including the mixing speed or operational state (on/off) based on the extent of mixing. Mixtures of butter and sugar may be monitored and controlled in this way. In a butter and sugar mixture, solid sugar particles dissolve into the butter mix, changing its reflectivity.

Figure 4:
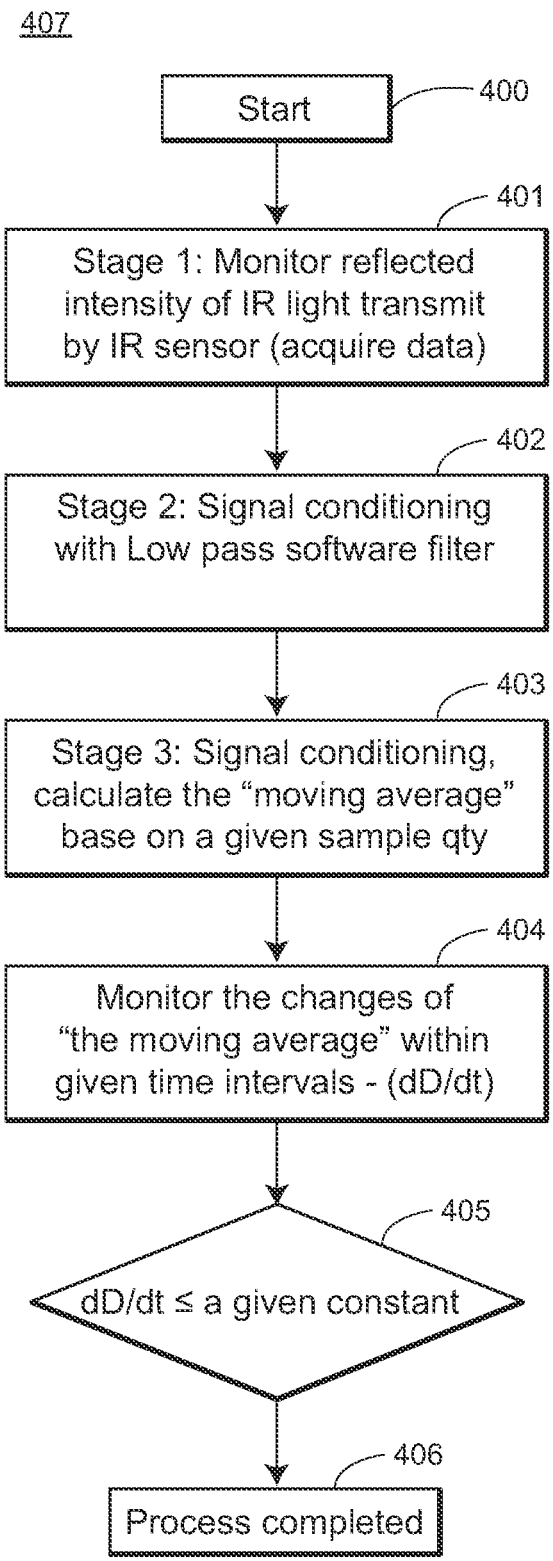
FIG. 4 is a flowchart illustrating the use of infrared data in a mixing process.
Figure 5:
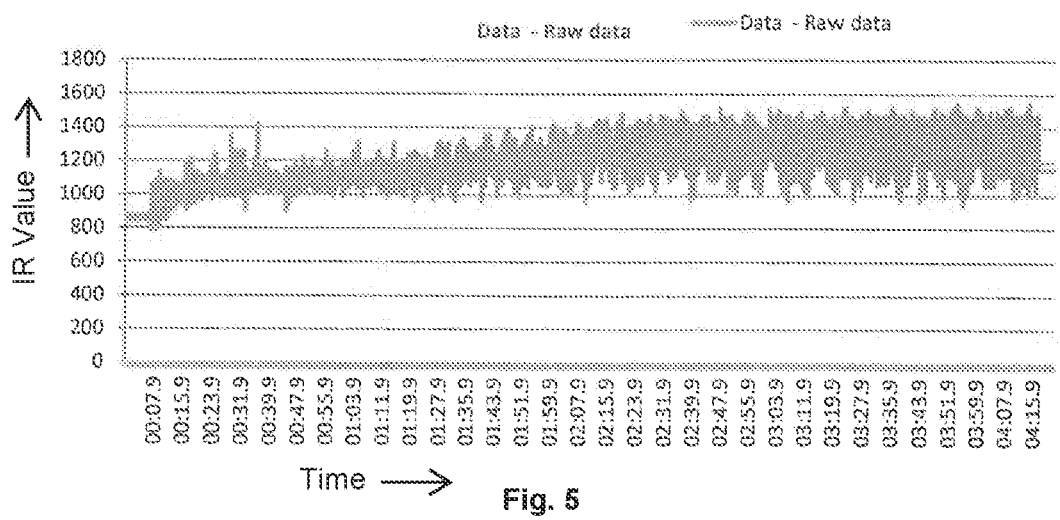
FIG. 5 is a graph illustrating arbitrary voltage values over time, being the output of an infrared sensor on a mixer.

A flowchart illustrating an example of control over a mixing, whisking, blending or whipping process (together "mixing") is illustrated in FIG. 4. It will be understood that the signal processing occurs in the mixer's processor (controller) 110 or by way of an auxiliary processor and processing, as required. The first step is the placement of unprocessed food materials into the mixer's bowl 105 and a user initiating a combined mixing and infrared monitoring operation 400. Subsequently, the reflected infrared light is received by the sensor 109 whereby the sensor 109 produces a data signal, for example a variable voltage, representative of the intensity of the reflected infrared light 401. The stream of voltage data from the sensor 109 during mixing is transmitted to the processor 110. The processor 110 operates on the raw data stream at, for example, 100 data samples per second. The raw data obtained from the sensor's 110 output voltage can be illustrated as a line composed of a series of data points over time, for example, as shown in FIG. 5. As illustrated in FIG. 5, it is difficult to distinguish useful data points from noise. FIG. 5 illustrates a typical data collection process performed on the contents of a bowl 105 in which egg whites are whisked over a time period of approximately 4 minutes and 16 seconds.

The processor 110 operates on the raw data with lowpass filter software 402. This data processing step is important to filter out unnecessary dynamic data such as signals reflected by the accessory or wire beater, ingredients that have accumulated on the sides of the bowl 105 and other irrelevancies. The lowpass digital filter obtains a current filtered value by subtracting the last filtered value from the current raw data value and multiplying it by a constant, then adding the last filtered value. The constant is based on process variables such as how fast a given process is occurring, bowl 105 size, etc. In the context of the whisking of eggs whites in a conventional bowl 105, constant value of 0.003 has been shown to be useful. The previous or last filtered value is stored so that it can be used in a subsequent calculation. The current filtered value is indicative of the overall amount of infrared reflected from the contents of the bowl 105 and is therefore representative of process variables such as the extent of mixing or the vertical height of the ingredients in the bowl 105. The raw data value is obtained by digitising the analogue output of the sensor 109. The same raw data depicted in FIG. 5 is illustrated after lowpass filtering in the graph of FIG. 6.

Figure 6:
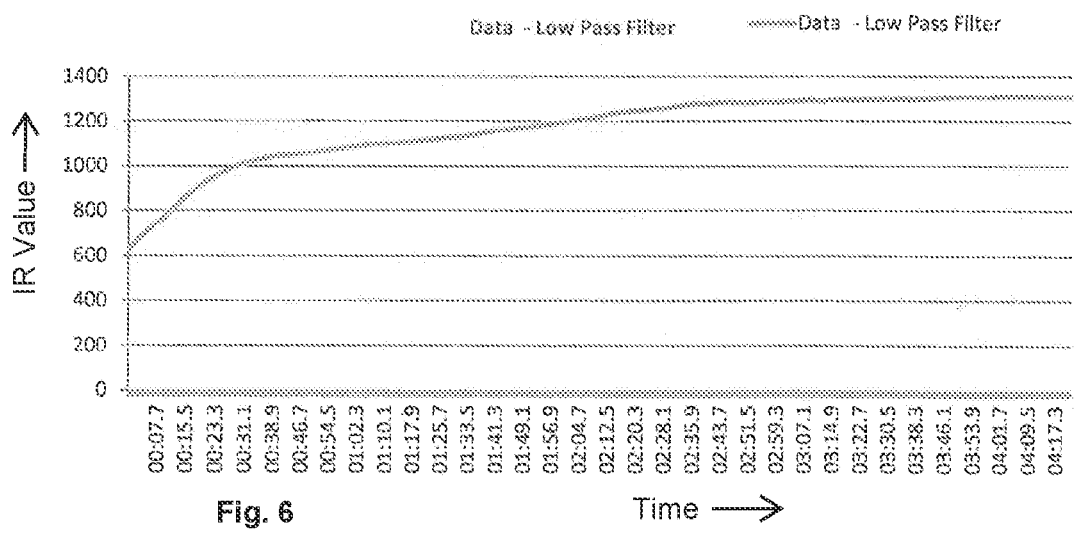
FIG. 6 illustrates the result of lowpass filtering of the data depicted in FIG. 5.
Figure 7:
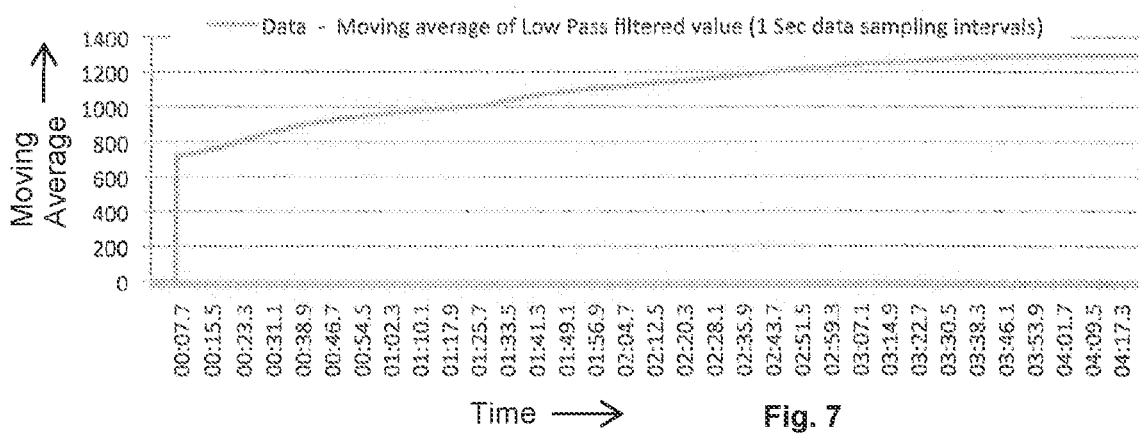
FIG. 7 illustrates the result of calculating and displaying the moving average of the lowpass filter data depicted in FIG. 6.

In the next step of the process illustrated in FIG. 4, a signal conditioning operation 403 is performed on the results obtained by lowpass filtering 402. In this step, filtered data is sampled at a given time interval, say 1 second in the example provided. This step calculates a moving average of the filtered data values to obtain a smoother trend line which allows changes in the mixing, blending or whisking process to be differentiated and identified by the processor 110. The resulting moving average over the same time interval as depicted in FIGS. 5 and 6 is shown in FIG. 7. Actual process information is obtained by monitoring the changes in the moving average 404. The processor 110 obtains information from the rate of change of the moving average over time. Assuming the moving average at the time t1 is A1 and the moving average at the time $t_2$ is $A_2$ and $t_2 > t_1$, the time rate of change of the moving average, $d_D/d_t$, is define by $(A_2 - A_1)/(t_2 - t_1)$.

The time rate of change of the moving average is calculated by the processor and compared to a target value 405. A target value can be empirically derived for any suitable process and ingredients when contained in a mixing bowl 105 and operated on by an accessory 103. When the change of the rate of the moving average, is equal to or less than the target value, a mixing process can be stopped or modified accordingly. Where the comparison value is higher than the target value, the process continues and further data is collected 407.

It will also be appreciated that the results of the comparison step 405 may also be used to estimate a time remaining in a given process by comparing the value to an idealised value stored in the processor's memory.

It will be appreciated that the instantaneous or continuous data provided by the infrared sensor 109 may be used to generate a graphic display of a process over time or an appropriate graphical alert on a graphic interface 111 located in the exterior of the device or on a networked device. The information can also be used directly by the processor to stop the motor 102, pause the motor 102 or change the motor's speed.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

The invention claimed is:

1. A food processor configured to process a food substance located in a container having an interior, the food processor including:
    an accessory including a member that extends into the interior and contacts the food substance, the accessory arranged to be located in the interior so that relative movement between the container and the accessory causes processing of the food substance, wherein the accessory is a whisk, dough hook or a beater;
    an electric motor operatively associated with the container and the accessory to cause said relative movement;
    a sensor to produce a sensor beam to be directed at the interior so as to produce a reflection from the food substance in the interior and to produce a signal indicative of an intensity of the reflection; and
    a controller operatively associated with the sensor and the electric motor, the controller configured to receive the signal from the sensor and to detect a change in the signal indicative of a change in the food substance in the container, the controller further configured to change operation of the motor when a predetermined change in the signal is detected by the controller, wherein the food processor includes a planetary gear arrangement connected to the electric motor to move the accessory.

2. A food processor configured to process a food substance located in a container having an interior, the food processor including:
    an accessory including a member that extends into the interior and contacts the food substance, the accessory arranged to be located in the interior so that relative movement between the container and the accessory causes processing of the food substance, wherein the accessory is a whisk, dough hook or a beater;
    an electric motor operatively associated with the container and the accessory to cause said relative movement;
    a sensor to produce a sensor beam to be directed at the interior so as to produce a reflection from the food substance in the interior and to produce a signal indicative of an intensity of the reflection; and
    a controller operatively associated with the sensor and the electric motor, the controller configured to receive the signal from the sensor and to detect a change in the signal indicative of a change in the food substance in the container, the controller further configured to change operation of the motor when a predetermined change in the signal is detected by the controller, wherein the food processor includes a base and a head pivotally attached to the base.

3. The food processor of claim 2, wherein the sensor is an infrared sensor and the sensor beam is an infrared beam.

4. The food processor of claim 2, wherein the controller is configured to change operation of the motor as a function of the intensity of the reflection.

5. The food processor of claim 4, wherein the controller is configured to record a base line reading in respect of the intensity of the reflection prior to operation of the processor, with the sensor and controller also being configured to determine a moving average of distance between the sensor and an upper surface of the food substance in the container, the upper surface being from where the sensor beam is reflected.

6. The food processor of claim 5, wherein the controller is configured to change operation of the electric motor as a function of distance between the sensor and the upper surface.

7. The food processor of claim 2, wherein the container is a bowl, and the processor includes a body containing the motor and supporting the accessory so that the accessory extends downwardly from the body to the interior, and the sensor directs said sensor beam downwardly toward the interior.

8. The food processor of claim 2, wherein the sensor and controller are configured to control the electric motor as a function of distance between the sensor and an upper surface of the food substance.

9. The food processor of claim 8, wherein the function includes a moving average of said distance.

\* \* \* \* \*